April 6, 1937.  C. N. SMITH ET AL  2,076,099
REFRIGERATOR SHELF
Filed June 18, 1936  4 Sheets-Sheet 1
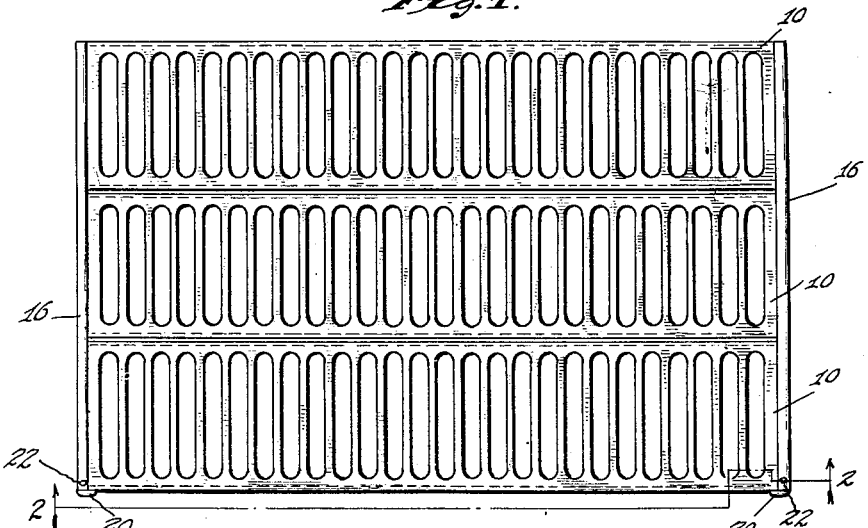
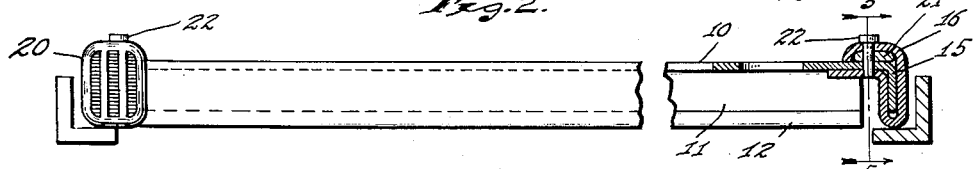
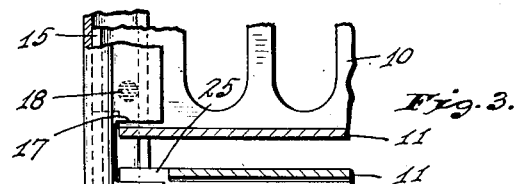
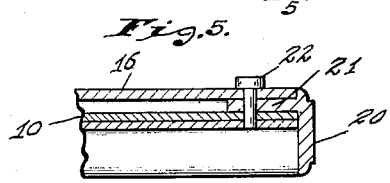
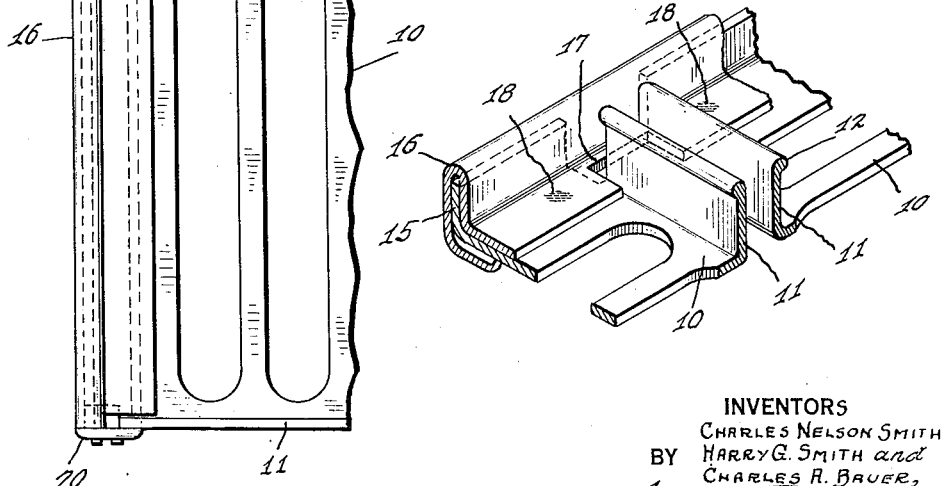
INVENTORS
CHARLES NELSON SMITH,
BY HARRY G. SMITH and
CHARLES R. BAUER,
ATTORNEYS April 6, 1937.                C. N. SMITH ET AL                 2,076,099
                              REFRIGERATOR SHELF
                            Filed June 18, 1936          4 Sheets-Sheet 2
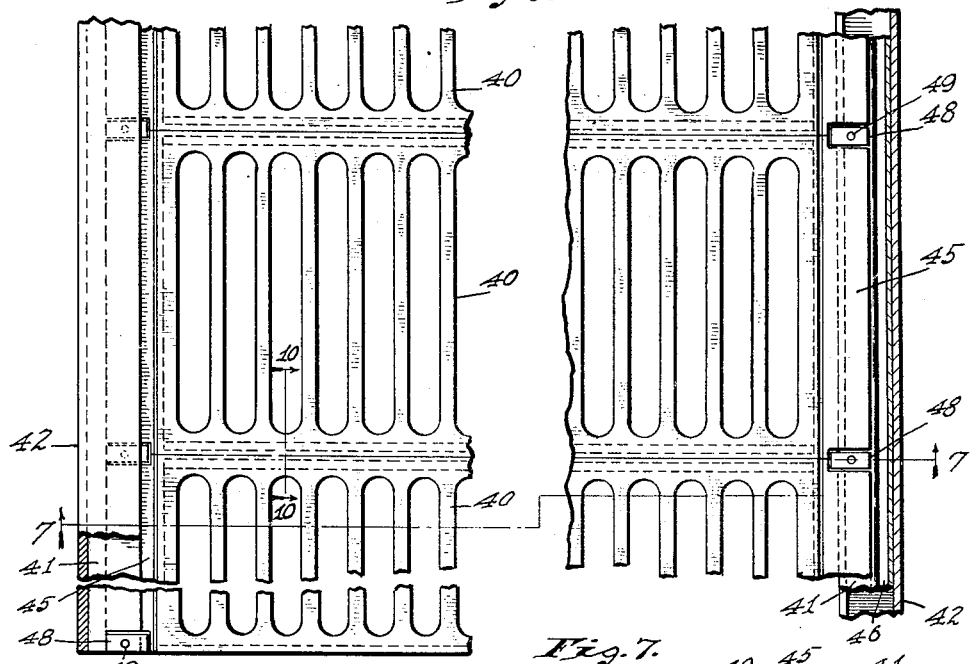
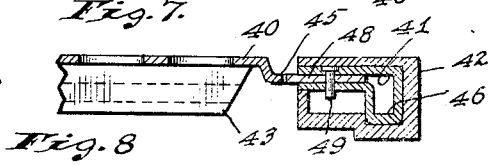
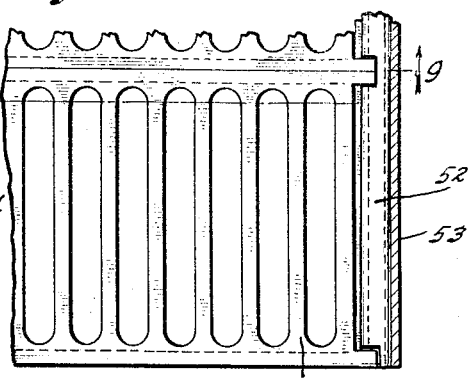
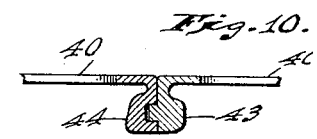
INVENTORS
CHARLES NELSON SMITH,
HARRY G. SMITH and
CHARLES A. BAUER,
BY
ATTORNEYS April 6, 1937.  C. N. SMITH ET AL  2,076,099
REFRIGERATOR SHELF
Filed June 18, 1936  4 Sheets-Sheet 3
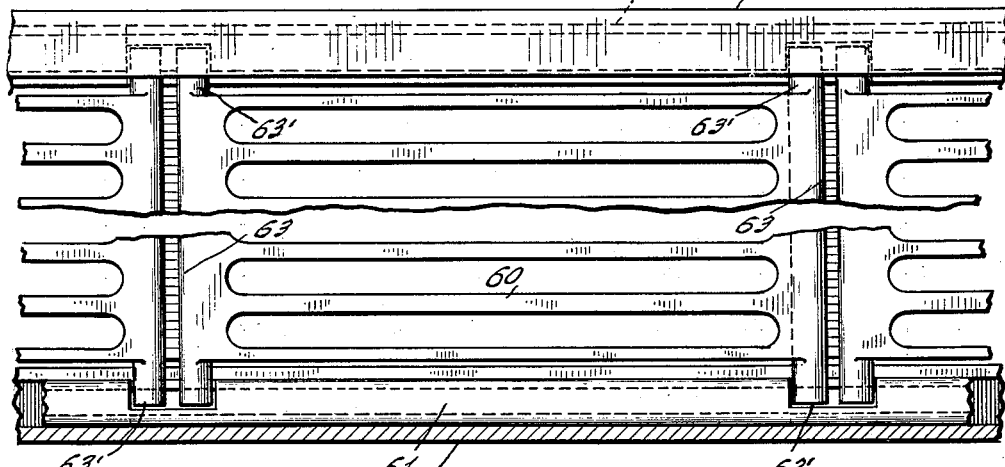
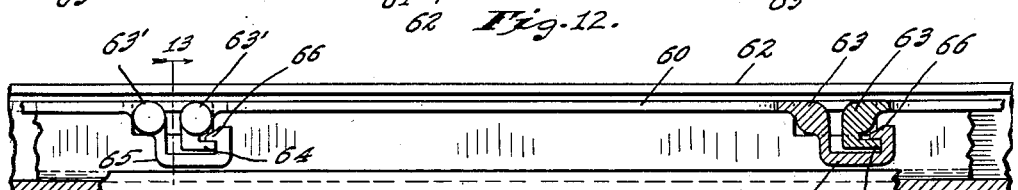
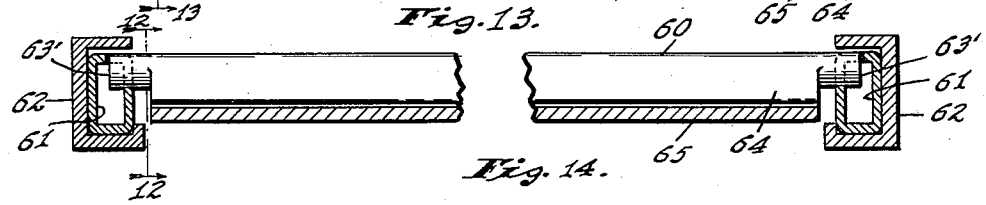
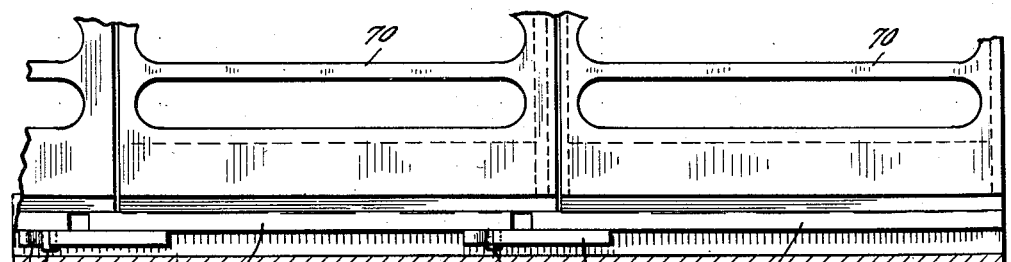
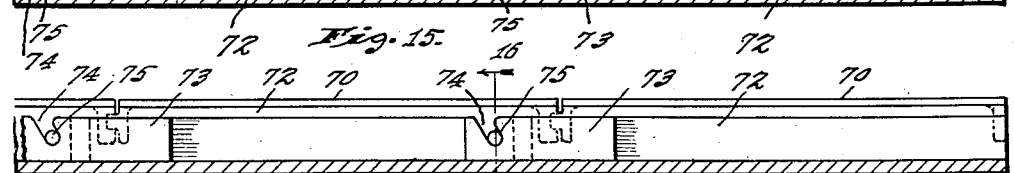
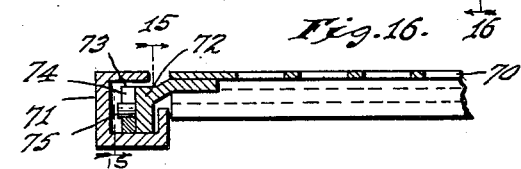
INVENTORS
CHARLES NELSON SMITH,
BY HARRY G. SMITH and
CHARLES A. BAUER,
ATTORNEYS April 6, 1937.  C. N. SMITH ET AL  2,076,099
REFRIGERATOR SHELF
Filed June 18, 1936  4 Sheets-Sheet 4
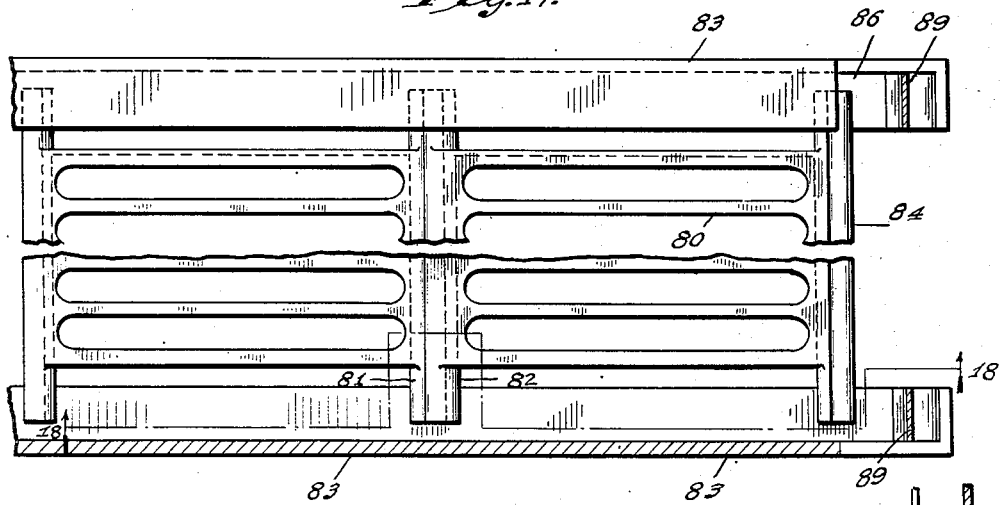
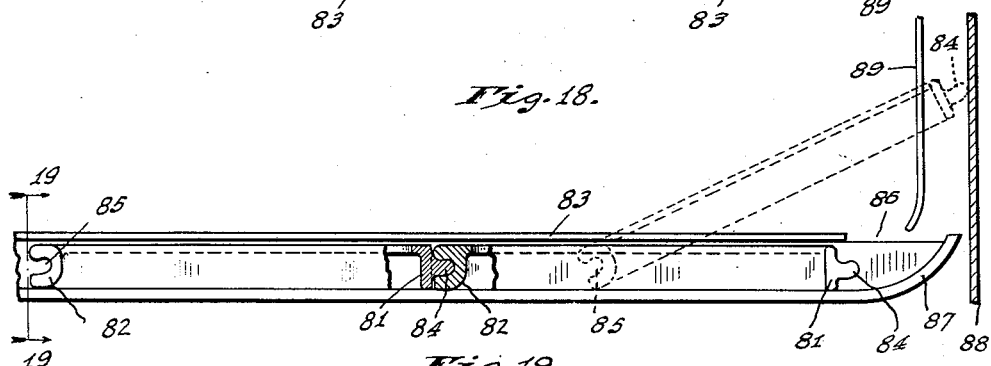
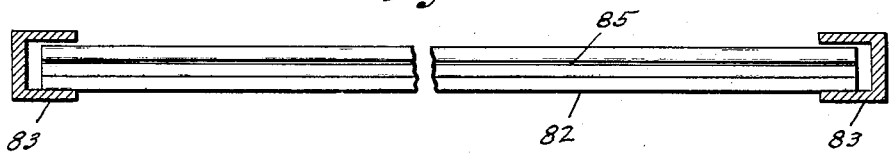
INVENTORS
CHARLES NELSON SMITH,
BY HARRY G. SMITH and
CHARLES A. BAUER,
ATTORNEYS Patented Apr. 6, 1937

2,076,099

UNITED STATES PATENT OFFICE 2,076,099

REFRIGERATOR SHELF

Charles Nelson Smith, University City, Mo., Harry G. Smith, Evansville, Ind., and Charles A. Bauer, Springfield, Mass., assignors to Hoosier Lamp & Stamping Corporation, Evansville, Ind., a corporation of Indiana Application June 18, 1936, Serial No. 85,830

4 Claims. (Cl. 211—153)

Our invention relates to fabricated metal refrigerator shelves, and has for its object the production of a shelf which can be economically and simply manufactured and which will possess advantages over prior shelves in the way of cleanliness and adaptability.

In carrying out our invention we form the shelf of a plurality of longitudinally co-extensive sections, and we connect these sections together so that, at least while in the refrigerator, they may be moved as a unit. In the preferred form, at least one of the shelf-sections is removable from association with the other shelf-sections so as to decrease the effective width of the shelf, and means are provided for releasably holding any such removable section or sections in place in association with the other sections.

The accompanying drawings illustrate our invention: Fig. 1 is a plan view of one form of a complete shelf; Fig. 2 is a front elevation of the shelf of Fig. 1 on a somewhat larger scale and with a portion of one end broken away on the section line 2—2 of Fig. 1; Fig. 3 is a fragmental bottom plan view of one front corner of the same shelf; Fig. 4 is a fragmental isometric view illustrating a detail of construction; Fig. 5 is a fragmental section on the line 5—5 of Fig. 2; Fig. 6 is a fragmental plan view of a modified form of shelf; Fig. 7 is a section on the line 7—7 of Fig. 6; Fig. 8 is a fragmental plan view of a third modification; Fig. 9 is a vertical longitudinal section on the line 9—9 of Fig. 8; Fig. 10 is a fragmental transverse section on the line 10—10 of either Fig. 6 or Fig. 8 illustrating a feature common to the shelves of those two figures; Fig. 11 is a fragmental plan view of a fourth modification; Fig. 12 is a section on the line 12—12 of Fig. 13; Fig 13 is a section on the line 13—13 of Fig. 12; Fig. 14 is a fragmental plan view illustrating one end of a fifth modification of our invention; Fig. 15 is a section on the line 15—15 of Fig. 16 and shows, in end elevation, the shelf of Fig. 14; Fig. 16 is a section on the line 16—16 of Fig. 15; Fig. 17 is a fragmental plan view of still another modification of our invention; Fig. 18 is a vertical section on the line 18—18 of Fig. 17; and Fig. 19 is a longitudinal vertical section on the line 19—19 of Fig. 18.

As indicated above, our shelf is made up of a plurality of perforated sections 10, shown in Fig. 1 as three in number. Each of these sections is formed with a downwardly projecting flange 11 along its longitudinal edges. As indicated in Figs. 2 and 4, the flanges 11 along their lower edges are provided with beads 12, it being contemplated that each shelf-section will be formed in the shape illustrated by extrusion. By eliminating the beads 12, however, each shelf-section can be formed from flat stock with its longitudinal edges bent downward at right angles to form the flanges 11.

In each end of each of the sections, the flanges 11 are cut away for a distance, and the web of the shelf is bent downwardly to form a transversely extending flange 15. In the assembly, the flanges 15 of the several sections are alined and spaced outwardly a slight distance beyond the ends of the flanges 11.

To tie the various shelf-sections together, we employ end members 16 extending for the full width of the shelf. The end members 16, which are conveniently formed of flat stock, are bent at right angles along a longitudinal line near one edge, such bend being received in the corner between the web of each shelf-section 10 and the transversely extending flange 15 thereon. Below the lower edges of the flanges 15, the end member 16 is bent outwardly and upwardly, its extreme upper edge being folded over the ends of the shelf-sections and downwardly into contact therewith to produce a finished appearance. As indicated in the drawings, the end members are formed to fit against the outer face of the flanges 15, but this is not essential, as the cross-sectional form of the end member may be varied to suit individual tastes or particular conditions.

If that portion of the end member 16 which lies against the lower face of each shelf-section is so wide that the adjacent ends of the flanges 11 would interfere with it, it may be notched as indicated at 17 in Fig. 4.

At least one of the shelf-sections 10 is permanently secured to both end members 16. The preferred method of doing this is to spot-weld the web of each shelf-section 10 to that portion of each end member lying against its lower face, such spot-welding being indicated at 18 in Figs. 3 and 4. Preferably, if spot-welding is used for the purpose indicated, it is performed before the upper edge of the end member is folded over the top of the shelf-section, so that it will not mar the finished appearance of the shelf.

For the sake of appearance, the ends of the end members 16 at the front of the shelf may be concealed as by the use of buttons 20 each of which is large enough to cover the end of the end member and is provided with a shank 21 by means of which it may be secured in place. As indicated in the drawings, the shank 21 extends into a space between the upper surface of the shelf-section and the inwardly bent upper edge of the end member 16, being held in place therein by a pin 22.

If it is desired to have all sections 10 of the shelf permanently secured in place in the end members 16, each of such shelf-sections may be spot-welded to the end members. It is frequently desirable, however, to make one or more of the shelf-sections 10 removable so as to decrease the effective width of the shelf and permit objects standing on a lower shelf in the refrigerator to extend upwardly through its plane. As shown in the drawings, the front shelf-section 10 is indicated as removable. It is not spot-welded to the end members 16 but instead is merely slidably received therein and held in place by the buttons 20 which overlap the flange 11 along the front edge of the removable shelf-section.

By making the pins 22 removable from the end members 16, the buttons 20 can be taken out and the front shelf-section 10 withdrawn by a sliding movement. The flange 11 at the rear edge of the front section 10 is cut away as indicated at 25 to permit the front section to be removed.

In the arrangement shown in Figs. 6 and 7 the shelf-sections 40 are interconnected by or mounted in end members 41 which are slidable in suitable guides 42 supported from the side walls of the refrigerator. The material of which the shelf-sections 40 is made are formed, as by extrusion, with downwardly extending flanges 43 and 44 extending along the opposite edges. As is clear from Fig. 10, one of such flanges, here shown as the flange 44, is provided with a longitudinally extending groove for the reception of a tongue on the flange 43 of the adjacent shelf-section 40. The use of interfitting projections on the reinforcing flanges of adjacent shelf-sections insures that those shelf-sections will be maintained substantially flush with each other throughout their entire length.

As is clear from Fig. 7, the flanges 43 and 44 terminate inwardly from the ends of the shelf-sections 40 leaving projecting web-portions 45 which are received in the end members 41. Each of the guides 42 is box-like in cross-section, and its bottom wall is offset along a longitudinal line to create a groove adapted to receive a flange 46 on the associated end member 41. Conveniently, the end member 41 is bent along longitudinal lines so that its edges will engage opposite faces of the web-portion 45 of the shelf-section, while the center portion of each of the end members is bent to provide the flange 46. Each guide 42 is provided in its inner face with a longitudinally extending slot which receives the web-portion 45 and those parts of the end member in contact with its upper and lower faces. Conveniently, the web-portions 45 are offset downwardly from the body of the shelf so that the upper surface of the shelf may be substantially flush with the upper surfaces of the guides 42.

Means are provided for holding the shelf-sections in place longitudinally of the end members 41, but such means are preferably arranged so that relative movement of each end member and the shelf-section in a direction lateral of the end member is possible. To this end, the outer corners of the web-portions 45 are notched to receive retainers 48 which conveniently are of the same thickness as the web-portions 45 and are held in place between the edges of the end members, as by pins or rivets 49.

The fact that the end members can move longitudinally of the shelf-sections makes the assembly of shelf, end-members, and guides 42 adjustable in length to accommodate for variations in the distance between the side walls of any refrigerator in which that assembly is to be installed. By making the pins 49 associated with those retainers 48 lying at the front ends of the end members removable, those retainers, together with the front shelf-section 40, can be withdrawn from the end members 41 to permit a reduction in the effective width of the shelf.

In the arrangement illustrated in Figs. 8 and 9, the shelf-sections 51 are formed with interfitting flanges, conveniently the same as the flanges 43 and 44 employed on the shelf of Figs. 6 and 7 and illustrated in Fig. 10. In the shelf-sections 51, however, the web of each section is cut away to leave the ends of the flanges projecting outwardly to be received in notches in end members 52. Conveniently, the end members 52 are of sheet-metal formed into a box-section, and are received in suitable guides 53 supported from the side walls of the refrigerator. The top wall or flange of the guide 53 is conveniently narrow enough so as not to interfere with upward movement of any shelf-section when it is removed from association with the end members 52. Each notch in the end members 52 which receives the interfitting flanges 43 and 44 of two adjacent shelf-sections is made wide enough to permit those shelf-sections to be moved apart, thus allowing the tongue on the flange 43 to be withdrawn from the groove in the flange 44.

The modification of our invention illustrated in Figs. 11, 12, and 13 resembles that shown in Figs. 8 and 9 in that the webs of the shelf-sections 60 are cut away to permit the outwardly projecting ends of the flanges to be received in notches in the end members 61. In addition, the flanges along the longitudinal edges of the shelf-section 60 are of different shape from those illustrated in Fig. 10, and the upper wall or flange of each guide 62 extends over the adjacent ends of the flanges so that no shelf-section can be removed from association with the end members until the shelf has been withdrawn from the guides 62 to an extent such that the section to be removed will lie wholly beyond the guides.

As is clear from Fig. 12, the reinforcement at each edge of each shelf-section 60 includes a generally circular bead 63. One of the beads 63 is provided with a longitudinally extending flange 64 spaced below the body of the bead and projecting inwardly of the associated shelf. The bead 63 at the opposite edge of the shelf-section is provided with a flange 65 which projects outwardly below and beyond the flange 64 of the adjacent shelf-section, where it is provided with a lip 66 which overlies the free edge of the flange 64.

Like the web of each of the shelf-sections 60, the flanges 64 and 65 are cut away at each end of the shelf-section to leave only the beads 63 extending beyond the body of the shelf-section and forming supports 63' received in notches in the end members 61. These notches have a width sufficient to permit the lip 66 on any shelf-section to be withdrawn from association with the flange 64 on the adjacent shelf-section, whereby the shelf-sections may be separated. As indicated above, however, the upper side or flange of the guide 62 extends over the supports 63', and it is therefore necessary to draw the shelf outwardly in the guide 62 until that section which is to be removed lies beyond the ends of the guide. After removal of the shelf-section, the remaining sections and the end members will of course be moved rearwardly in the guides 62 to their normal position.

In Figs. 14, 15, and 16 there is illustrated an arrangement in which both the web and the flanges of the shelf-sections 70 are terminated short of the guides 71, the shelf-sections being supported by supporting members 72 which are secured to the shelf-sections at the ends thereof and which extend outwardly through slots in the guides 71 to rest upon the bottom walls of such guides. The flanges extending along the longitudinal edges of the shelf-sections 70 may be provided with interfitting provisions of the general tongue-and-groove type such as is illustrated in Fig. 10.

To interconnect adjacent shelf-sections 70, we may provide the supporting member 72 on one of them with a connector 73 which overlaps the end of the support 72 of the adjacent section, such connector being provided with an upwardly opening slot 74 adapted to receive a pin 75 on the support 72 which it overlaps. The upper wall or flange of the guide 71 overlies the supports 72 and thus normally prevents disengagement of any pin 75 from its associated slot 74, and thus the several shelf-sections may be moved as a unit in the guides. However, upon withdrawing the shelf from the guides until one shelf-section 70 and its associated connectors lie beyond the guides, it is possible to disengage the pin-and-slot connection by means of which it was connected to the adjacent shelf-section. The slots 74 are so shaped as not to interfere with the withdrawal from them of the associated pin 75 when two adjacent shelf-sections are swung relatively to each other about the interfitting tongue and groove at their adjacent edges.

In the structure illustrated in Figs. 17, 18, and 19, each shelf-section 80 is provided along its longitudinal edges with downwardly projecting flanges 81 and 82, which flanges project beyond the ends of the web of the shelf-section into guides 83. The adjacent shelf-sections are interconnected by a tongue-and-groove joint embodying a tongue 84 on the outer surface of each flange 81 and a groove 85 on the outer face of each flange 82. Each tongue 84 is curved transversely of itself, as indicated in Fig. 18, and each groove 85 is correspondingly shaped so that the tongue can not be withdrawn from the groove when the two adjacent shelf-sections are in co-planar relation. As a result, the shelf constituting all the shelf-sections may be moved in the guides 83 as a unit, the shelf-sections being held in co-planar relationship by the top and bottom walls of the guides. By withdrawing the shelf from the guides until the front shelf-section lies therebeyond and then swinging the withdrawn shelf-section about the axis of the tongue-and-groove joint, it can be separated from the adjacent shelf-section and the effective width of the shelf reduced.

Another expedient for reducing the width of the shelf is illustrated in Fig. 18. As there indicated, the upper wall of the guide 83 is cut away near the rear end of the guide to leave an opening 86, and the bottom wall of the guide is curved upwardly, as indicated at 87 to a point adjacent the back wall 88 of the refrigerator. By forcing the shelf rearwardly in the guides 83, the curved portion 87 of the bottom wall of each guide will raise the rear end of the rear shelf-section, causing the projecting portions of the flange 82 along such rear edge to pass upwardly through the openings 86. As rearward movement of the shelf continues, the rear edge of the rear shelf-section will be forced upwardly against the back wall 88 of the refrigerator, as indicated in dotted lines in Fig. 18. This movement can be continued until the rear shelf-section lies substantially in a vertical position against the refrigerator-wall 88, in which case the effective width of the shelf will be reduced by the width of the rear shelf-section.

If it is desired to restore the shelf to its full effective width, the front shelf-section is moved forwardly in the guides 83, the other horizontally disposed section or sections moving with it because of the transverse curvature of the tongues 84 and grooves 85 by which they are interconnected. The rear shelf-section, previously disposed against the back wall 88 of the refrigerator returns to normal position aided by the force of gravity acting upon it. In order to insure that the rear shelf-section will swing downwardly into the plane of the guides 83 when the remaining shelf-sections are moved forwardly, it is advisable to provide supplementary guides 89 which are spaced from the back wall 88 of the refrigerator to provide a channel which receives the ends of the flange 81 on the rear edge of the rear shelf-section when that rear edge is displaced upwardly beyond its normal position in the guides 83.

The modification of our invention illustrated in Figs. 17, 18, and 19 just described resembles that shown in Figs. 14, 15, and 16 in that adjacent shelf-sections are connected by what is in effect a tongue-and-groove connection. In Figs. 14, 15, and 16, however, the grooves, instead of extending for the full length of the shelf-sections as do the grooves 85 in Fig. 18, have a length equal only to the thickness of the connector 73. In both modifications, the walls of the grooves are disposed at an angle to the plane of the shelf so that the pins or tongues which they receive can not be withdrawn from the grooves as long as adjacent shelf-sections remain in co-planar relationship.

We claim as our invention:

1. A fabricated metal refrigerator-shelf, comprising a plurality of parallel co-planar shelf-sections each provided along its longitudinal edges with downwardly projecting reinforcing flanges, and means for interconnecting adjacent shelf-sections together and including a member connected to one shelf-section and extending laterally therefrom into engagement with a part on the adjacent shelf-portion whereby such adjacent sections may be moved as a unit laterally of themselves and in their common plane.

2. A refrigerator shelf as set forth in claim 1, with the addition that said member and part interengage through a tongue-and-groove connection, the walls of the groove being at an angle to the plane of the shelf, whereby separation of adjacent shelf-sections by relative lateral movement is impossible as long as they remain co-planar.

3. A refrigerator shelf as set forth in claim 1, with the addition that the web portion of each shelf-section projects outwardly beyond the ends of said flanges, there being two of said connecting members located at opposite ends of the shelf and co-operating with the outwardly projecting web-portions of adjacent shelf-sections.

4. A refrigerator shelf as set forth in claim 1, with the addition that said flanges project longitudinally beyond the ends of the web portion of each shelf-section, there being two of said connecting members located at opposite ends of the shelf and co-operating with the longitudinally projecting ends of the flanges on adjacent shelf-sections.

CHARLES NELSON SMITH.
HARRY G. SMITH.
CHARLES A. BAUER.